Oct. 24, 1950        B. V. MILLER        2,526,762

MACHINE TOOL FOR MILLING TUBULAR WORKPIECES

Filed Oct. 22, 1948        7 Sheets-Sheet 1

Fig. 1.

Inventor
BERT V. MILLER
Weatherford and Weatherford
Attorneys

Oct. 24, 1950          B. V. MILLER          2,526,762

MACHINE TOOL FOR MILLING TUBULAR WORKPIECES

Filed Oct. 22, 1948          7 Sheets—Sheet 2

Inventor
BERT V. MILLER
By Weatherford and Weatherford
Attorneys

Oct. 24, 1950  B. V. MILLER  2,526,762
MACHINE TOOL FOR MILLING TUBULAR WORKPIECES
Filed Oct. 22, 1948  7 Sheets-Sheet 4

Inventor
BERT V. MILLER
By Weatherford and Weatherford
Attorneys

Oct. 24, 1950     B. V. MILLER     2,526,762
MACHINE TOOL FOR MILLING TUBULAR WORKPIECES
Filed Oct. 22, 1948     7 Sheets-Sheet 5

Inventor
BERT V. MILLER
By Weatherford and Weatherford
Attorneys

Oct. 24, 1950.     B. V. MILLER     2,526,762
MACHINE TOOL FOR MILLING TUBULAR WORKPIECES
Filed Oct. 22, 1948     7 Sheets-Sheet 6

Inventor
BERT V. MILLER
By Weatherford and Weatherford
Attorney

Patented Oct. 24, 1950

2,526,762

UNITED STATES PATENT OFFICE 2,526,762

MACHINE TOOL FOR MILLING TUBULAR WORKPIECES

Bert V. Miller, Memphis, Tenn., assignor to Layne & Bowler, Incorporated, Memphis, Tenn., a corporation of Delaware Application October 22, 1948, Serial No. 55,954

11 Claims. (Cl. 90—11.44)

This invention relates to machines for processing cylindrical work pieces, such as tubing or pipe, and particularly relates to a machine adapted to face the opposite ends of such work piece and to mill threads therein.

It has long been considered desirable to mill the threads of cylindrical work pieces such as tubing or pipe because of the improved accuracy of threading formed by the milling process. It has also been recognized that it is desirable to concurrently form the threads on the opposite ends of such work piece, thereby insuring axial alinement of such threads.

Many attempts have been heretofore made to accomplish such desired threading, but the means by which such result has been attempted to be accomplished have primarily been unsatisfactory because of their incorporation of an undesirable number of mechanisms, and because of their inability to perform the function for which designed, through inaccuracies in coordination.

The machines heretofore devised have essentially been provided for accomplishing concurrent threading of the opposite ends of the work piece by mounting the work piece for revolution in a position fixed against longitudinal movement relative to the machine and have employed machine elements carrying threaded tools or hobs positioned eccentrically of the work piece in cutting engagement with one side of the periphery thereof and mounted for longitudinal shift relative to the work piece as the revolution of the work piece has progressed. As will readily be seen, when concurrent threading of the opposite ends of the work piece has been undertaken it has been necessary to employ two cutters and to concurrently shift the two cutters during the revolution of the work piece, resulting in an excess of mechanism, and requiring an accurate coordination which has not been achieved.

The present invention is designed to simplify the means by which concurrent threading of the opposite ends of a work piece may be accomplished and to accurately coordinate the elements of the machine, and in general differs from the machines known in the art in providing for longitudinal movement of the work piece during revolution thereof, such longitudinal work piece shift being accomplished relative to the fixed cutting position of the spaced tools and in coordination with the aforesaid revolution. In accomplishing this objective the present invention makes use of a new and novel work holder means by which the work piece revolution is accomplished and shift of the work piece accurately coordinated with the work revolution is effected.

The principal object is to provide a machine tool assembly which includes a pair of tool holders, adjustable longitudinally and transversely of the machine and rotatable in a fixed position, and a longitudinally shiftable work holder which includes means for holding and revolving a work piece and means coordinated with such revolution for gradually longitudinally shifting said work piece a predetermined limited distance relative to said tool holders.

A further object of the invention is to provide a machine tool having new and novel means for holding a work piece.

A further object of the invention is to provide such work holding means with cooperating means for effecting longitudinal shift of the work piece during processing thereof.

A further object of the invention is to provide a new and novel arrangement for effecting coordination between work piece revolution and longitudinal shift of such work piece.

A further object of the invention is to provide a machine tool which is adapted to concurrently process the opposite ends of a cylindrical work piece and which includes rotatable tools held during processing in a fixed position of rotation and a work piece holder including means for revolving the work piece and cooperatively effecting predetermined longitudinal shift thereof during processing.

A further object of the invention is to provide a machine tool by which a work piece may be processed at its opposite ends by a single chucking.

And a further object of the invention is to generally improve the design, operation and efficiency of machine tools, particularly those adapted to process cylindrical work pieces.

The means by which the foregoing and other objects of this invention are accomplished and the manner of their accomplishment will readily be understood from the following specification upon reference to the accompanying drawings, in which.

Referring now to the drawings in which the various parts are indicated by numerals:

The machine illustrated is one which is particularly adapted for milling a cylindrical work piece as the tubing 10 and is so arranged that the ends of the tubing may be faced by the machine and subsequently the opposite ends of the tubing simultaneously threaded, the threading through the arangement of the present inventoion being in axial alinement.

The machine primarily consists of a bed 11 which may be supported upon suitable supports 13, upon which bed the various elements of the present machine are mounted and supported. The bed includes side walls 15 which at their upper ends carry ways 17, the ways being also disposed longitudinally of the machine and being adapted to have slidably mounted thereon the carriages for the variaus elements of the machine.

Adjacent the opposite ends of the bed, tool carriages 18, 19 are mounted slidably upon the ways 17 and are adapted for longitudinal movement along the ways for adjustment of the relative positions of the carriages and the tools carried thereby upon the machine. Intermediate the tool carriages 18, 19 a work carriage 21 is mounted slidably upon the ways 17. In general, the work piece 10 to be processed is handled by the mechanisms associated with the work carriage and the processing tools are associated with the tool carriages.

The tool carriages 18, 19 and the elements associated therewith are substantially identical and accordingly description of one of the carriages and its associated elements is deemed sufficient to describe the operation of both.

Mounted on each tool carriage for movement transversely of the machine is a head 23, upon which head a spindle 25, axially parallel with the longitudinal center line of the machine, is mounted for rotation. A motor 26 is mounted upon the carriage and is coupled to the spindle 25 by belts 27 and pulleys 28 to effect rotative drive of the spindle. It will be understood that the motor and coupling illustrated is a preferred form of drive for spindles, but that any suitable means for rotating the spindles may be employed if desired. It also is preferred that the motors be controlled by a single control, although obviously separate controls may be employed if desired.

Positioning of the tool carriages on the ways 17 is maintained by clamps 29, each of the carriages being coupled to a clamp 29 by hydraulic cylinder and piston means which include cylinders 31 and projecting piston rods 33, the cylinders being in communication with a suitable source of fluid pressure, not shown. The projecting end of each of the piston rods is attached to its related tool carriage and the opposite end of each of the cylinders is anchored to its related clamp 29. The clamps 29 are preferably removably fixed to the bed 11, as by bolts or other suitable means, such removable attachment enabling the use of the machine for work pieces of various lengths.

Movement of the tool heads 23 transverse the machine is accomplished by cross feed screws 35 which are preferably provided with hand wheels 37 and which also each preferably have a suitable calibrated gage or dial and indicator 39 associated therewith for the accurate determination of the amount of transverse movement of the tool heads. The cross feed screws 35 each threadedly engage a head nut 40 on each of the heads 23 to accomplish the transverse movement in substantially conventional manner. At its inner end opposite to the attachment of piston rods 33 each of the tool carriages is provided with a forwardly projecting stop member 41 adjustably threaded on a threaded rod member 42 rigidly attached to the tool carriage.

Figure 1:
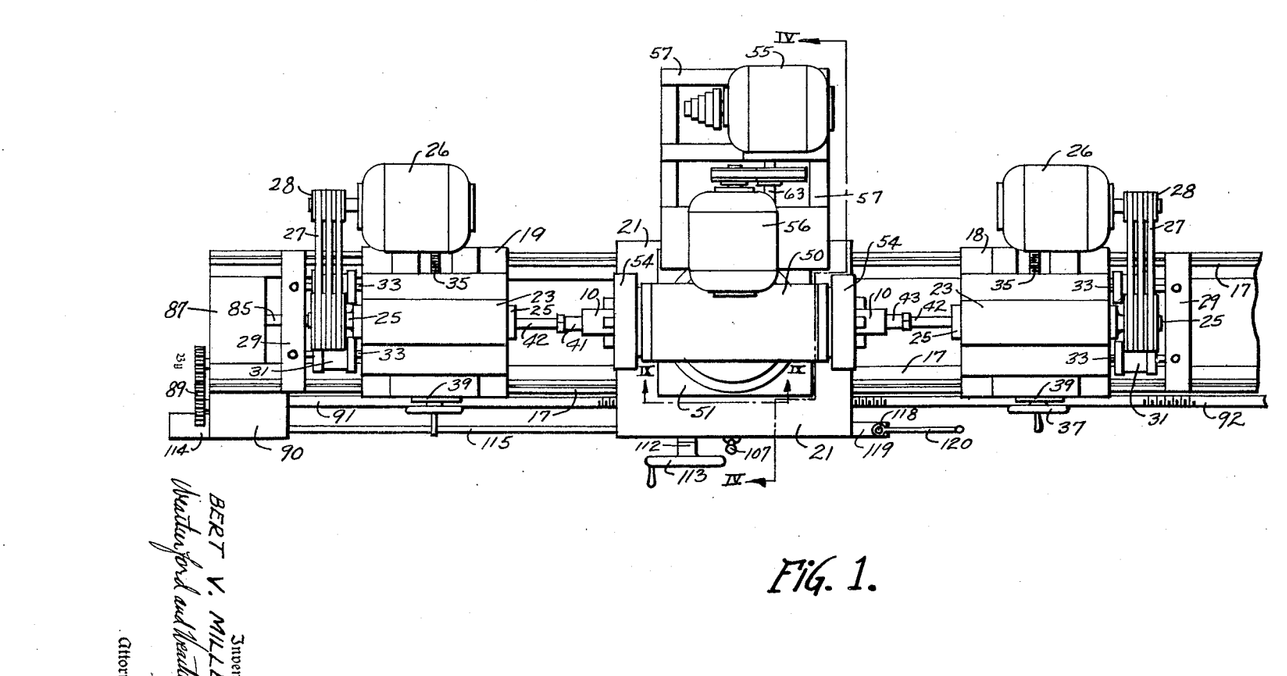
Fig. 1 is a top plan view of the machine tool of the present invention with an end portion at the right of the drawing omitted.
Figures 2, 13, 14:
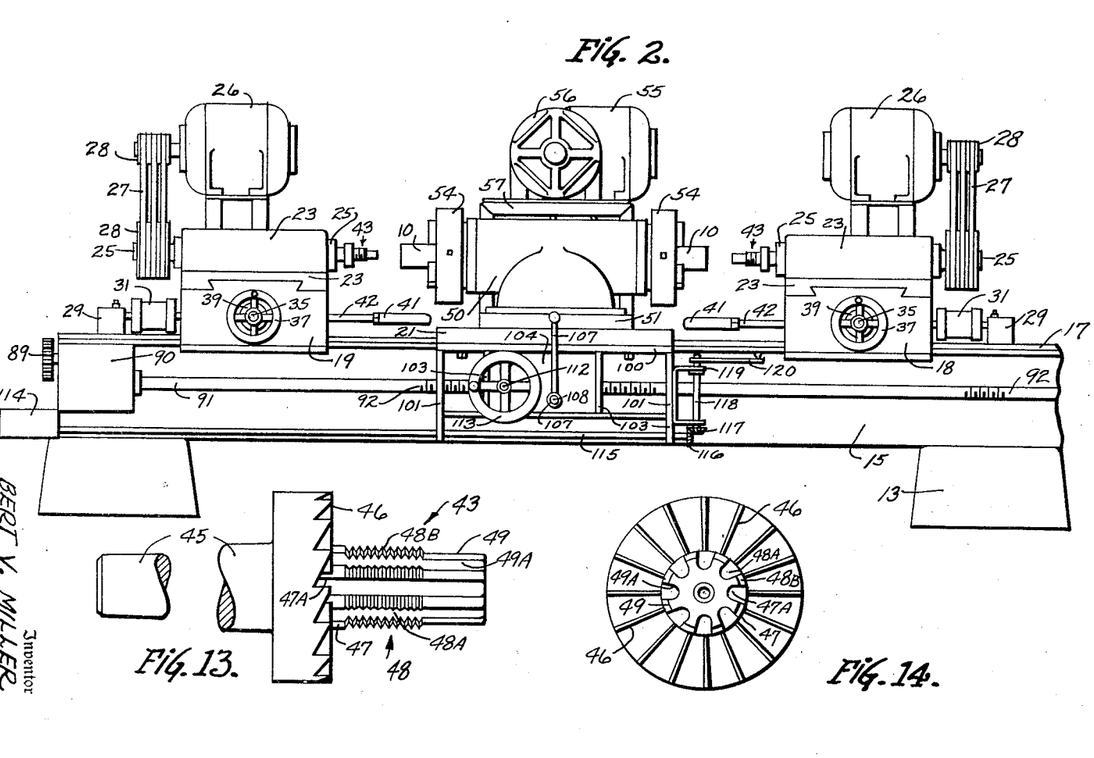
Fig. 2 is a side elevational view of the arrangement shown in Fig. 1.
Fig. 13 is a side elevational view of the preferred form of tool or hob of the present invention.
Fig. 14 is an end view of the hob shown in Fig. 13.

Mounted co-axially with the spindles 25 for rotation thereby are the cutter tools 43. Each of the cutter tools is preferably provided with a shank 45 adapted to engage the socket (not shown) of spindle 25 and to be fixed therein in suitable manner. As will be seen from Figs. 13 and 14, the preferred form of cutter tool 43 is a four zone tool including a facing zone 46, an undercutting zone 47, a threading zone 48, and a blanking zone 49. It will be seen that in its preferred form the blanking zone 49 is fluted as at 49A and has the general characteristics of a blanking mill; that the threading zone 48 is essentially a multiple ring tooth cutter section, fluted as at 48A and serrated between the flutes at 48B, the threading section having no lead or pitch and in general having the characteristics of a thread mill or hob. It will also be noted that the outside diameter of the blanking zone is substantially equal to the tool diameter at the root of the thread serrations. The undercutting zone 47 is fluted as at 47A and is of the same general characteristics as the blanking zone 49, except that it will be noted that the outside diameter of the undercutting zone is substantially equal to the outside diameter of the threading zone. It will be noted also that the diameter of the facing zone 46 is substantially equal to, or very slightly greater than, the diameter of the work piece to be processed by the machine and is considerably in excess of the diameter of the blanking, threading and undercutting zones. The facing zone is toothed as at 46, to give it the general characteristics of a facing mill.

Mounted upon the work carriage 21 is a housing 50 having an integral base 51 which is seated on and rigidly secured to the work carriage 21. Carried by the housing 50 are longitudinally spaced thrust bearings 52, in which a hollow spindle 53 is journalled for rotation. The spindle 53 is provided at its opposite ends with suitable work holding means, as chucks 54, and is axially alined with the longitudinal center line of the machine and adapted to receive and hold the work piece 10 for processing by the machine.

Rotation of the work spindle 53 and work piece carried thereby is accomplished preferably by motors 55, 56, mounted on the upper portion of a platform 57 rigidly secured to and supported from the work carriage 21. The motor 55 is preferably coupled by suitable belt and pulleys to a worm gear reducer 58, preferably mounted on a lower portion of platform 57, by which reducer the motor speed is reduced and through which drive of a shaft 59 by the motor is accomplished. The shaft 59 is coupled by an overrunning clutch 61 to the main shaft 63, which main shaft is provided at its forward end with a worm 65. Engaged by the worm 65 is a worm wheel 67 surrounding and keyed to the spindle 53, so that upon rotation of the shaft 63 and of the worm 65 carried thereby rotation of the work spindle 53 is accomplished. Through this arrangement the motor 55 is enabled to rotatively drive the spindle 53 at an extremely low speed which is preferably in the nature of one R. P. M., and which speed is preferably employed in connection with the concurrent processing of the opposite ends of the work piece 10 by the threading, blanking and undercutting zones of the tools 43. The rate of speed is determined by the material and the diameter of the work piece to be processed.

It is preferred that the motor 56 be provided to drive the work spindle 53 at a greater speed for processing of the work piece by the facing mill zone 46 of the tools 43. The motor 56 is coupled by suitable belt and pulleys to the shaft 63 forwardly of the overrunning clutch 61 and is adapted upon operation to effect rotation of the spindle 53 at a speed substantially in excess of that drive from the motor 55. It will be noted that by the coupling of the motor 56 to the shaft 63 forwardly of the overrunning clutch 61 the coupling between the shafts 59 and 63 is not effected during operation of the motor 56.

Surrounding and keyed to the spindle 53, preferably adjacent the worm wheel 67, for rotation with the spindle is a bevel gear 69. Drivingly engaged by the bevel gear 69 is a second bevel gear 71 carried by the upper end of a stub shaft 73, the stub shaft 73 being journalled in a suitable bearing 75 carried by the housing 50. Below and exterior the housing 50 the stub shaft 73 carries at its opposite end a small bevel gear 77 which drivingly engages a similar small bevel gear 79 carried by one end of a shaft 81.

The opposite end of the shaft 81 is longitudinally slidable in a sleeve 83. In the embodiment shown, it will be seen that the shaft 81 is squared as at 81A, the interior of the sleeve 83 being of similar interior shape and being engaged by the portion 81A to insure rotation of the sleeve 83 with the shaft 81. It will be understood that the sleeve 83 may be splined to the shaft 81 or otherwise secured for rotation while permitting longitudinal sliding therewith in other suitable manner.

Similarly engaged by the opposite end of the sleeve 83 is one end of a shaft 85, which, as shown, is preferably square as at 85A to engage the interior of the sleeve 83 for rotation therewith and to be longitudinally slidable relative thereto.

It will be seen that the bevel gears 69, 71 are substantially equal in size and that the small bevel gears 77, 79 are also of substantially the same size, so that the rotation of shaft 85 is in equal ratio to the speed of revolution of the work spindle 53. The shaft 85 extends into a change gear box 87 by which the shaft 85 is coupled to gear train 89 and through gear train 89, and suitable gearing 90 to a longitudinally extending lead screw 91, which has an extended threaded portion 92 intermediate its length. Through the change gear box the speed imparted to the shaft 85 is further reduced or controlled in desired manner so that the revolution of the lead screw 91 is exactly coordinated to the speed of the work spindle revolution. Lead screw 91 is supported by and coupled into the gearing 90 at one end of the machine, and is journalled in a suitable bearing (not shown) attached to the opposite end of the machine.

A pair of depending brackets 93 are rigidly secured, as by suitable bolting, to the underside of the work carriage 21, adjacent its forward edge, but spaced rearwardly therefrom. The brackets 93 are longitudinally spaced apart and carry adjacent their lower ends thrust bearings 94 in which a carriage nut 95 is journalled. Carriage nut 95 is interiorly threaded and threadedly engages the threaded portion 92 of the lead screw 91. Integral with the brackets 93 are braces 96 which are connected by an integral cross member 97.

Surrounding the carriage nut 95 between the brackets 93 is a tube 98 which is adapted to engage the carriage nut and effect carriage movement thereby responsive to lead screw revolution. The tube 98 is provided with forwardly projecting lips 99 which underlie the cross member 97. The tube 98 is resilient, the resiliency urging the lips 99 to separate and upon separation of the lips the carriage nut 95 may turn freely within the tube 98 while closing of the lips effects clamping of the carriage nut by the tube to prevent independent nut rotation.

Preferably the upper lip 99 is provided with an integral pad 99A which is contacted by the lower lip during clamping to insure a more solid seat. It is also preferred that separation of the lips be limited and for that purpose an adjustable limit, as screw 99B is provided, extending loosely through a suitable aperture in the lower lip into threaded engagement with the upper lip or its pad. It will be seen that the head of the screw is spaced from the upper lip sufficiently to permit opening of the lips to disengage the tube 98 from carriage nut 95.

When nut rotation is prevented by tube engagement, revolution of the lead screw will cause the nut to advance longitudinally thereof, and it will be seen that rotation of the nut at a speed in excess of the speed of lead screw revolution may be employed to advance the nut in the direction of the lead of the screw, while advancement in the opposite direction may be effected by overriding the lead screw revolution. Both the latter nut movements may be effected through the controls employed herein. Support and mounting of these controls and of the means for effecting closure of the tube lips 99 are provided by a frame work which consists of an upper horizontal bar 100, which is rigidly attached to the underside of work carriage 21, and extends longitudinally thereof abutting the forward edges of brackets 93. Integrated as by welding with the upper bar 100 are vertical end bars 101 which depend from the upper bar. A lower bar member 102 spans between the vertical bars 101 and is preferably secured thereto at its opposite ends as by welding, the opposite points of securing being preferably spaced above the lower ends of the vertical bars. Seated on and rigidly secured to the lower bar 102 are intermediate vertical members 103 which extend upward to the upper bar 100 and are rigidly secured thereto. Extending between the upper and lower bars 100, 102, and from one intermediate bar 103 to the other and rigidly secured to each of the bars is a plate 104, which is provided with an inwardly extending ear 105 secured as by bolt 106 to the cross member 97.

Figures 3, 10:
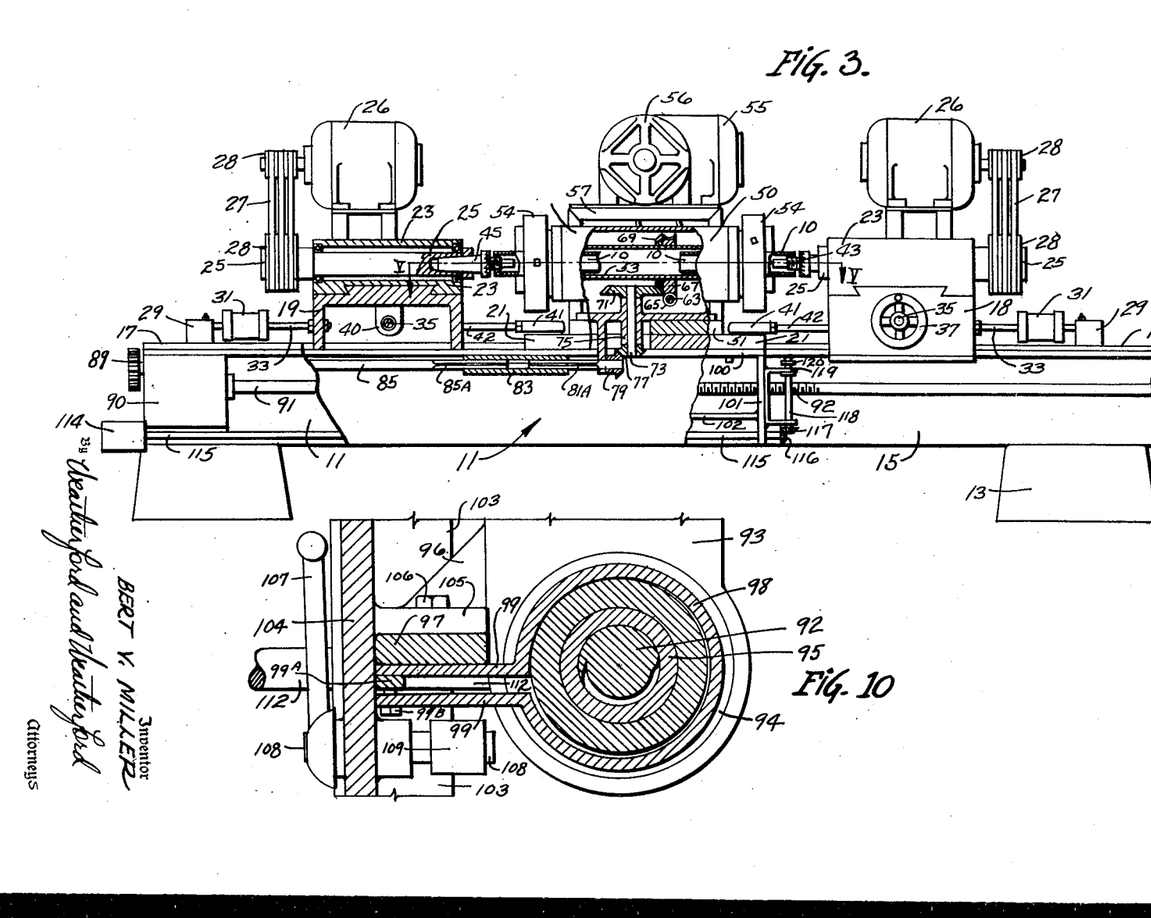
Fig. 3 is a side view, partly in elevation and partly in section, showing further details of the arrangement of the parts of the present invention.
Fig. 10 is a fragmentary sectional view taken on the line X—X of Fig. 9 showing the carriage nut disengaged from the work carriage.
Figure 4:
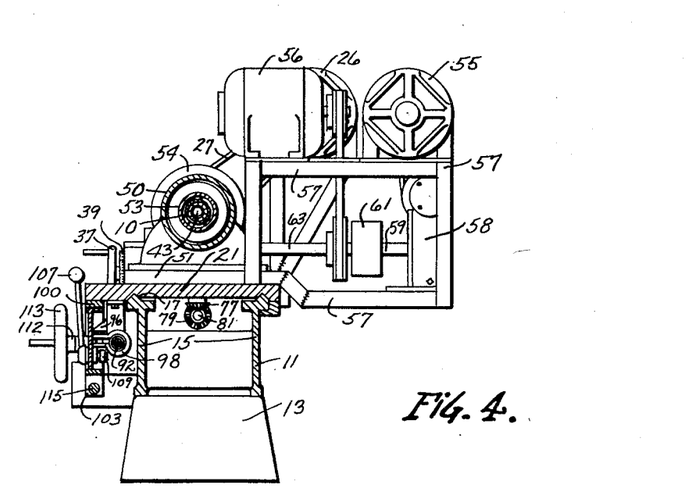
Fig. 4 is a transverse sectional view taken on the line IV—IV of Fig. 1.

Control of the closure of lips 99 is effected through a hand lever 107 carried exterior the cover plate 104, which is rigidly secured to the outer end of a stub shaft 108. Shaft 108 is journalled in a suitable bearing in plate 104 and at its inner end has a cam 109 rigidly secured thereto in eccentric relation. The cam 109 underlies the lips 99, as shown in Figs. 10 and 11, and when in the position shown in Fig. 10 the lower lip 99 is not engaged by the cam and is urged by the resiliency of the tube to move away from the upper lip, freeing the carriage nut 95 from engagement by the tube 98.

Figure 11:
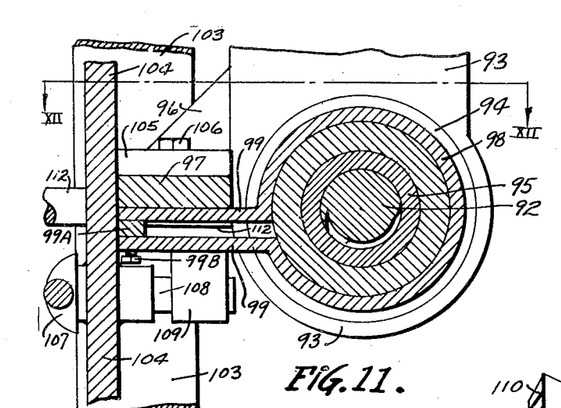
Fig. 11 is a view similar to Fig. 10 showing the carriage nut engaged with the work carriage.
Figure 12:
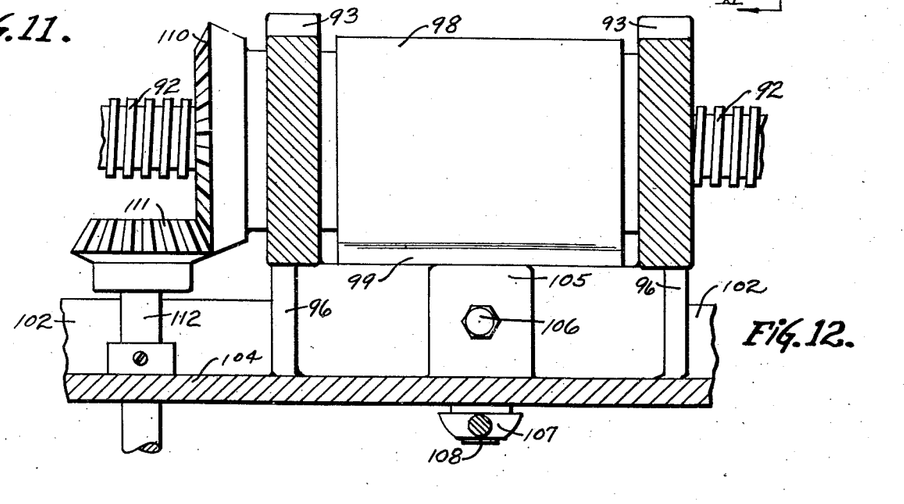
Fig. 12 is a fragmentary sectional plan view taken on the line XII-XII of Fig. 11.
Figure 15:
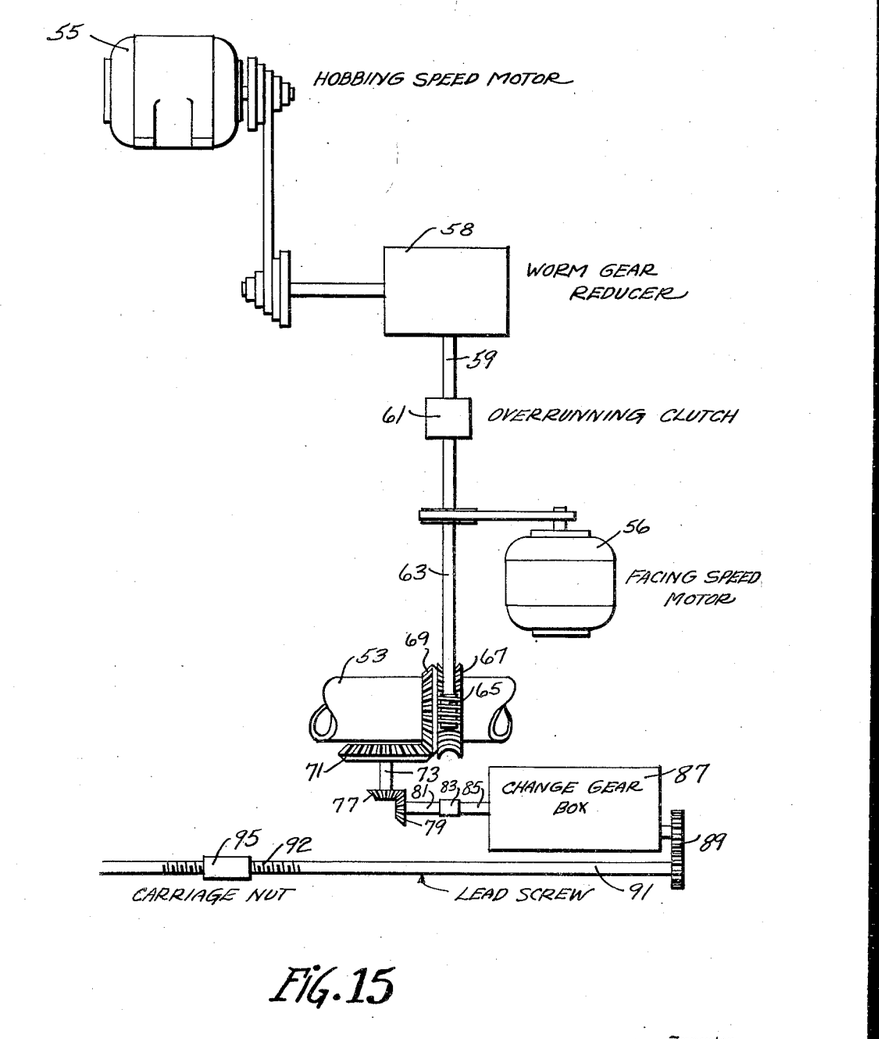
Fig. 15 is a schematic drive diagram illustrating the operation of the present invention.

When the hand lever 107 is depressed to the position shown in Fig. 11, the cam 109 is moved into engagement with the lower lip 99, moving that lip toward closed position and effecting engagement by the interior of the tube 98 with the exterior of the carriage nut 95, holding the tube clamped in this engagement. It will thus be seen that upon rotation of the lead screw 91 in coordination with the revolution of the work spindle 53, the carriage nut 95 in threaded engagement with the lead screw will turn freely with the lead screw so long as the tube 98 remains out of clamping engagement with the carriage nut. When the hand lever 107 is depressed and the cam 109 moved into engagement with the lips of the tube 98, the carriage nut is held against rotation with the lead screw and drive of the lead screw by the work spindle will consequently effect advancement of the carriage nut thereon, such advancement carrying with it the work carriage 21 and the instrumentalities associated therewith.

Keyed to the carriage nut 95 beyond the right hand bracket 93 is a bevel gear 110 with which a bevel gear 111 is engaged. The bevel gear 111 is carried by the inner end of a shaft 112, also suitably journalled in and extending through plate 104, to the outer end of which shaft a control, as a suitable hand wheel 113, is attached. Through the means of the hand wheel and the interengaged bevel gears 110, 111, manual longitudinal movement of the work carriage may be accomplished, rotation of the bevel gear 111 effecting rotation of the bevel gear 110 and consequently rotation of the carriage nut 95. Through the employment of this manual means the work carriage may be longitudinally shifted whether the lead screw is in revolution or at a standstill, as described above.

Selective operation of motors 55, 56 is accomplished through a suitable rotary switch housed in a switch box 114 and electrically connected to the respective motors. A contact arm, not shown, is mounted within the switch box and is attached to one end of an elongated rod 115. Intermediate its length rod 115 is journalled in and supported by the lower extension of end bars 101, and carries at its opposite end a bevel gear 116 which is engaged by a similar bevel gear 117 carried by a short control rod 118. The control rod is suitably journalled in the projecting legs of a U-shaped bracket 119, rigidly attached preferably to the right hand end bars 101. A control lever 120 is attached to the upper end of control rod 118. It will be seen that movement of lever 120 will rotate rod 118 and gear 117, effecting equal rotation of gear 116 and switch rod 115, the switch contact arm being swung thereby from one contact to another as desired.

In the operation of the device, the tool carriages 18, 19 are positioned on the ways 17 and spaced apart a distance to accommodate the length of the work piece to be processed thereby, with the piston rods 33 respectively fully extended from their cylinders 31. When so positioned the clamps 29 are rigidly attached to the bed 11, thus anchoring the tool carriages at their extreme inward position of longitudinal movement and the threaded stops 41 adjusted on their rods 42 to establish a space between the stops determined by the desired finished length of the work piece. The piston rods 33 may then be retracted moving the tool carriages longitudinally outwardly. The heads 23 are moved transversely rearwardly of the machine by the cross feed screws 35, clearing the work spindle 53 for the insertion of the work piece 10 therein. The work piece 10 is inserted in the spindle and engaged by the chucks 54, the tool carriages are returned transversely of the machine to bring the tool spindles 25 and the tools 43 carried thereby into axial alinement with the work piece 10. In the embodiment shown, the facing zone 46 of each of the tools 43 is thus alined for milling the opposite ends of the work piece 10.

Figure 5:
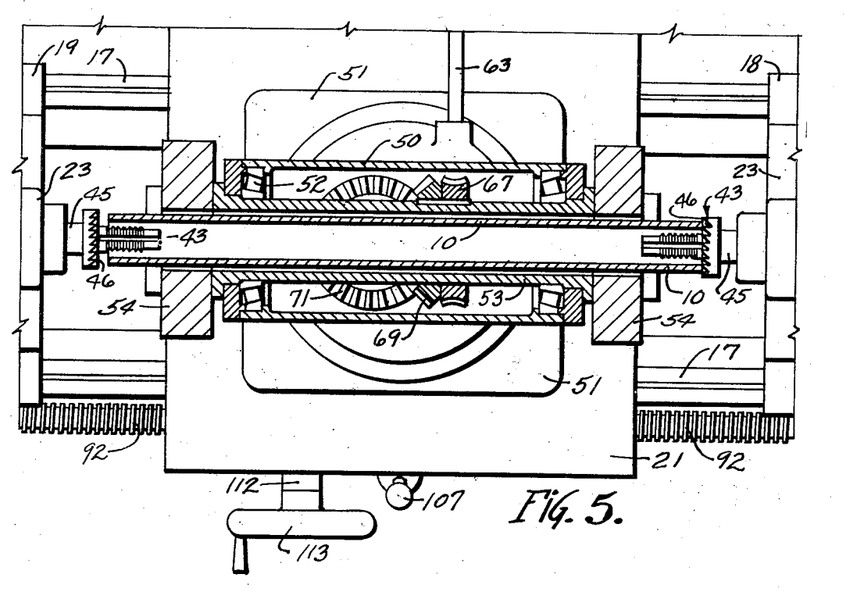
Fig. 5 is a fragmentary sectional plan view on an enlarged scale taken on the line V—V of Fig. 3 showing the work piece being preliminarily processed.

The tool motors 26 are energized, rapidly rotating the cutter tools 43 at cutting speed. The motor 56 may then be energized through the operation of switch control 120 beginning revolution of the work spindle 53 through the drive hereinabove described and the work carriage 21 manually shifted through the operation of the hand wheel 113 to bring one end of the work piece 10 into engagement with the facing zone of one of the cutters 43. It will be noted that the stop 41 is in alinement with the base 51 of the work carriage, so that excess shift of the carriage beyond the desired distance will cause abutment of the stop by the base, preventing any damage to the work piece or to the tool by maintaining the spacing established. If any further excess shift is attempted the entire tool carriage is moved therewith against the effect of the associated cylinder and piston. Preferably this initial position is that illustrated in Fig. 5 of the drawings in which the work carriage 21 has been shifted to the right to bring the end of the work piece into engagement with the facing zone of the cutter. When facing one end of the work piece has thus been accomplished the work carriage is, through operation of hand wheel 113, manually shifted in the opposite direction to bring the opposite end of the work piece 10 into facing contact with the opposite tool 43.

Figure 6:
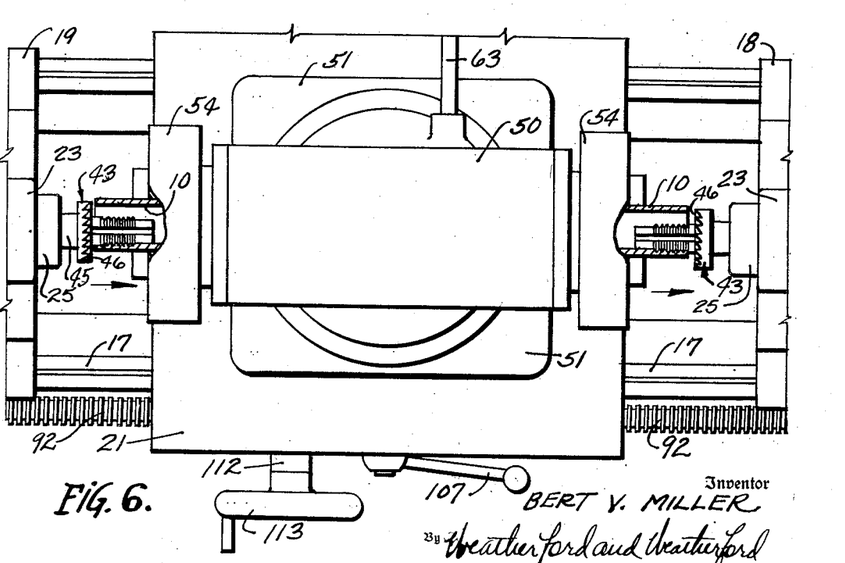
Fig. 6 is a fragmentary plan view on a similar scale, partly in section, illustrating the position of the parts at the beginning of the threading operation.
Figure 7:
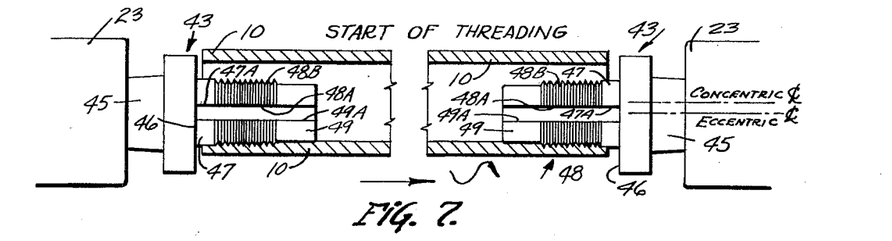
Fig. 7 is a schematic view illustrating the arrangement of the parts, as shown in Fig. 6.
Figure 8:
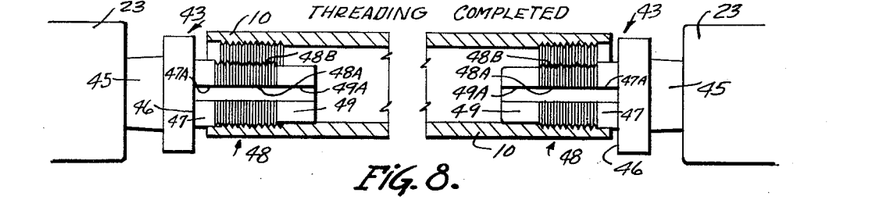
Fig. 8 is a view similar to Fig. 7 showing the arrangement of the parts after threading of the work piece has been completed.
Figure 9:
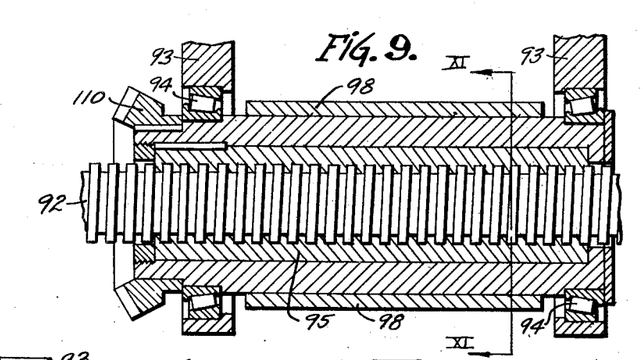
Fig. 9 is a fragmentary sectional elevation taken on an enlarged scale on the line IX—IX of Fig. 1, illustrating details of the special carriage nut and lead screw of the present invention.

When the end facing of the work piece has been completed the tool carriage is minutely backed off manually to the position shown in Fig. 6 in which the work piece is just clear of the facing zone 46 of the left hand tool 43 and out of contact therewith.

The motor 56 is deenergized and low speed motor 55 is energized through the selective control 120 to drive the work spindle 53 at the low speed hereinabove described. When the low speed motor has taken over the drive of the work spindle, the hand lever 107 is depressed moving the cam 109 into engagement with the lower lip 99 and effecting clamping by the tube 98 of the carriage nut 95. The tool heads 23 are shifted forwardly by the operation of the cross feed screws 35, thus moving the tools 43 to a position eccentric of the work piece 10 and bringing the undercutting, threading and blanking zones 47, 48, 49 into cutting engagement with the interior of the work piece 10, this transverse movement being continued until the tools are moved in to the full depth of cut desired. The amount of this latter transverse shift of the tool heads may readily be accurately determined from the gage 39.

The three zones 47, 48, 49 of each of the tools simultaneously operate upon the work piece and during such operation are rotated in a fixed position. While the tools are being rapidly rotated, the work piece 10 is revolved, as previously described, such revolution, through gears 69, 71, 75, 77, shafts 81, 85, change gearing 87, and gear train 89 effects coordinated revolution of lead screw 91. The work carriage nut 95 is held against rotation by the clamped tube 98 and through the engagement of the nut with the lead screw 91 the work carriage and work piece carried thereby are moved steadily along the bed longitudinally of the machine, in the present instance being shown as moved from left to right. Through the coordination of the lead screw drive with the work spindle revolution the work carriage is moved a distance equal to the lead of the thread desired during one revolution of the work spindle so that a complete helical thread having the desired lead is simultaneously formed in the opposite ends of the work piece.

As the threading operation is accomplished the blanking zones 49 form a milled finish surface inwardly of the threaded zones of the work piece and the undercutting zones 47 form a suitable undercut zone adjacent the ends of the work piece. When the processing operation has been completed the tool heads 23 are moved transversely a minor distance until the tools are clear of the work piece, at which time the tool carrigases 18, 19 may be retracted by the cylinders 31 and piston rods 33, moving the tools out of the work piece. The tool carriages may then be again moved transversely of the machine rearwardly and the work piece removed from the work spindle.

It will be understood that when processing of larger or longer work pieces is desired adjustment of the spacing of the carriages in the manner described may be made. When a work piece of excessive length is to be handled suitable steady rests may be employed for support of the work piece intermediate the tools and the work spindle.

I claim:

1. In a machine tool for processing a work piece, which includes a bed, ways extending longitudinally of the bed, tool supporting carriages mounted on said ways and spaced apart, milling tools rotatably mounted on said tool carriages, means for rotating said tools, and means for adjusting the position of said tools transverse said bed and relative to said work piece to establish milling engagement between said tools and the opposite ends of said work piece, means for holding and revolving said work piece and for effecting gradual movement of said work piece longitudinally of said machine in concurrent coordination with work piece revolution, which latter means comprise a work carriage slidably mounted on said ways, a housing rigidly attached to said work carriage, a spindle revolvably supported within said housing, motor means supported by said work carriage and drivingly coupled to said spindle to effect revolution thereof, a lead screw mounted on said bed, a bevel gear mounted concentrically of and fixed to said spindle within said housing for revolution with said spindle, a vertical shaft journalled in said housing and having its upper end adjacent said spindle carried gear and its lower end exterior said housing below said work carriage, a second bevel gear fixed to said upper shaft end and engaging the first said gear, shafting horizontally disposed longitudinally of said bed, the lower end of said shaft being drivingly coupled to said horizontal shafting and said horizontal shafting being geared to said lead screw, whereby said lead screw is drivingly coupled to said spindle for lead screw revolution coordinately responsive to spindle revolution, support means rigidly secured to and depending from said work carriage, a carriage nut journalled in said support means and threadedly engaged with the threaded portion of said lead screw, said carriage nut being adapted to turn with said lead screw upon lead screw revolution, a resilient tube loosely surrounding said carriage nut between said support means, means mounted on said support means adapted to engage said tube and effect closure thereof into clamping engagement with said nut, said tube upon such closure holding said nut against turning with said screw.

2. In a machine tool for processing a work piece, which includes a bed, ways extending longitudinally of the bed, tool supporting carriages mounted on said ways and spaced apart, milling tools rotatably mounted on said tool carriages, means for rotating said tools, means for adjusting the position of said tools transverse said bed and relative to said work piece to establish milling engagement between said tools and the opposite ends of said work piece; means for holding and revolving said work piece and for effecting gradual movement of said work piece longitudinally of said machine in concurrent coordination with work piece revolution, which latter means comprise a work carriage slidably mounted on said ways, a spindle revolvably supported by said work carriage, motor means supported by said work carriage and drivingly coupled to said spindle to effect revolution thereof, a lead screw mounted on said bed, gear means drivingly coupling said spindle to said lead screw for revolution of said lead screw responsive to spindle revolution, support means rigidly secured to and depending from said work carriage, a carriage nut journalled in said support means and threadedly engaged with the threaded portion of said lead screw, said carriage nut being adapted to turn with said lead screw upon lead screw revolution, resilient clamp means loosely surrounding said carriage nut, and cam means carried by said support means contacting said clamp means and adapted to close said clamp into engagement with said nut, said clamp upon such closure holding said nut against turning with said screw, whereby revolution of said lead screw responsive to spindle revolution effects advancement of said work carriage along said ways.

3. A machine tool for processing a work piece to concurrently form helical threads adjacent the opposite ends thereof, comprising a bed having longitudinal ways, a pair of tool carriages anchored on said bed in relatively fixed, longitudinally spaced positions, each carriage rotatably supporting a milling tool having circular threads, means for rotating said tools, a work carriage slidably mounted on said ways intermediate said tool carriages, a work spindle revolvably mounted on said work carriage, work piece engaging means associated with said work spindle, a lead screw supported from said bed, motor means supported by said work carriage for revolving said work spindle, a gear encircling said spindle and fixed thereto for revolution therewith, driving connections between said gear and said lead screw to revolve said lead screw responsive to spindle revolution, a carriage nut attached to said work carriage and threadedly engaging said lead screw, clamp means associated with said work carriage surrounding said nut to immobilize said nut relative to said work carriage whereby said lead screw revolution effects advancement of said nut along said lead screw and of said work carriage along said ways, said tools being positioned to respectively millingly engage a minor segment of the opposite end portions of said work piece, said work carriage being advanced along said ways a distance equal to the length of the lead of said helical threads, while said work piece is revolved one complete revolution and during tool rotation in said milling engagement.

4. A machine tool for processing a work piece to concurrently form helical threads adjacent the opposite ends thereof, comprising a bed having longitudinal ways, a pair of tool carriages anchored on said bed in relatively fixed, longitudinally spaced positions, each carriage rotatably supporting a milling tool having circular threads, means for rotating said tools, a work carriage slidably mounted on said ways intermediate said tool carriages, a work spindle revolvably mounted on said work carriage, work piece engaging means associated with said work spindle, a lead screw supported from said bed, motor means supported by said work carriage for revolving said work spindle, driving connections between said work spindle and said lead screw to revolve said lead screw responsive to spindle revolution, a carriage nut attached to said work carriage and threadedly engaging said lead screw, clamp means associated with said work carriage surrounding said nut to immobilize said nut relative to said work carriage whereby said lead screw revolution effects advancement of said nut along said lead screw and of said work carriage along said ways, said tools being positioned to respectively millingly engage a minor segment of the opposite end portions of said work piece, said work carriage being advanced along said ways a distance equal to the length of the lead of said helical threads while said work piece is revolved one complete revolution and during tool rotation in said milling engagement.

5. A machine tool for processing a work piece to concurrently form helical threads adjacent the opposite ends thereof, comprising a pair of tool carriages adjustably mounted in relatively fixed, longitudinally spaced positions, each carriage rotatably supporting a milling tool having circular threads, means for rotating said tools, a work carriage mounted intermediate said tool carriages, a work spindle revolvably mounted on said work carriage, work piece engaging means associated with said work spindle, a lead screw associated with said carriages, motor means supported by said work carriage for revolving said work spindle, driving connections between said work spindle and said lead screw to revolve said lead screw responsive to spindle revolution, a carriage nut attached to said work carriage and threadedly engaging said lead screw, clamp means associated with said work carriage surrounding said nut to immobilize said nut relative to said work carriage whereby said lead screw revolution effects advancement of said nut along said lead screw and of said work carriage between said tool carriage, said tools being positioned to respectively millingly engage a minor segment of the opposite end portions of said work piece, said work carriage being advanced a distance equal to the length of the lead of said helical threads, while said work piece is revolved one complete revolution and during tool rotation in said milling engagement.

6. A machine tool for milling helical threads in opposite end portions of a pipe, comprising a work holder, means for clamping said pipe journalled in said holder, a pair of milling cutters having circular threads of identical pitch, means for independently adjustably positioning said cutters longitudinally with relation respectively to said end portions, means for rotating said cutters, means for adjusting each of said cutters respectively into desired cutting engagement with said end portions, a lead screw, means for slowly revolving said clamping means, a gear encircling said clamping means and fixed thereto for rotation therewith, driving connections between said gear and said lead screw to effect lead screw revolution responsive to clamping means revolution, threaded means attached to said work holder engaged by said lead screw and advanced longitudinally by said lead screw revolution, said lead screw revolution being coordinated with said clamping means revolution to gradually longitudinally shift said work holder and said clamping means concurrently with said clamping means revolution a distance equal to the length of the lead of said helical threads during each complete clamping means revolution.

7. A machine tool for milling helical threads in opposite end portions of a pipe, comprising a work holder, means for clamping said pipe journalled in said holder, a pair of milling cutters having circular threads of identical pitch, means for independently adjustably positioning said cutters longitudinally with relation respectively to said end portions, means for rotating said cutters, means for adjusting each of said cutters respectively into desired cutting engagement with said end portions, a lead screw, means for slowly revolving said clamping means, driving connections between said clamping means and said lead screw to effect lead screw revolution responsive to clamping means revolution, threaded means attached to said work holder engaged by said lead screw and advanced longitudinally by said lead screw revolution, said lead screw revolution being coordinated with said clamping means revolution to gradually longitudinally shift said work holder and said clamping means concurrently with said clamping means revolution a distance equal to the length of the lead of said helical threads during each complete clamping means revolution.

8. A machine tool for processing a work piece, said tool comprising a bed having longitudinal ways, a pair of tool carriages shiftably mounted on said ways, the proximate ends of said carriages being spaced apart, means for respectively effecting independent limited longitudinal shift of said tool carriages on said ways, and a work carriage slidably mounted on said ways between said tool carriages, said work carriage including means for engaging said work piece intermediate its length for revolution; milling tools rotatably mounted in said tool carriages and adapted to engage opposite end portions of said work piece, means for rotating said tools, separate means for revolving said work piece; feed means carried by said bed, driving connection between said work carriage and said feed means to move said work carriage and work piece along said bed away from one of said tool carriages toward the other said tool carriage concurrently with said work piece revolution, and a stop member attached to said other tool carriage and projecting toward said work carriage in alinement therewith, limiting said movement.

9. A machine tool for processing a tubular work piece, said tool comprising a bed having longitudinal ways, a work carriage and a pair of tool carriages independently slidably mounted on said ways, said work carriage including rotatable means for holding an oppositely projecting work piece intermediate its length; said tool carriages being disposed at opposite ends of said work carriage and including rotatable thread milling tools respectively facing opposite ends of said work carriage; means for rapidly rotating said tools, means for moving said tool carriages along said ways, and said tools into respective positioning relatively to the opposite ends of said work piece, means for transversely shifting said tools into cutting engagement with said work piece, means for relatively slowly turning said work piece; longitudinally progressing feed means carried by said bed, means for effecting driving connection between said work holding means and said feed means to move said work carriage and work piece along said bed away from one of said tool carriages and toward the other thereof concurrently with said work piece revolution, and means for limiting said movement.

10. A machine tool for processing a work piece, said tool comprising a bed having longitudinal ways, a pair of tool carriages spaced apart along and slidably mounted on said ways, axially alined milling tools respectively mounted in said carriages and means for rotatably driving said tools, clamp means adjustably fixed to said bed, a work carriage slidably mounted on said ways between said tool carriages and having means for engaging and holding a said work piece for revolution, means to anchor said carriage to their respective said clamp means and effect limited longitudinal movement of said tool carriages along said ways, and shift of said tools into milling position with respect to opposite end portions of said work piece, means for shifting said tools into milling engagement with said work piece; means for revolving said work piece; feed means carried by said bed, means for driving said feed means, and means for effecting connection between said work holding means and said feed means to move said work carriage and work piece along said bed away from one of said tool carriages toward the other said tool carriage responsive to work piece revolution.

11. A machine tool for processing a tubular work piece, said tool comprising a bed having longitudinal ways, a work carriage and a pair of tool carriages independently slidably mounted on said ways, said work carriage including rotatable means for holding said work piece intermediate its length and rotating said work piece; said tool carriages being disposed at opposite ends of said work carriage and including rotatable thread milling tools respectively facing opposite ends of said work carriage; means for rapidly rotating said tools, means for moving said tool carriages along said ways, and said tools into respective positioning relatively to the opposite end portions of said work piece, means for transversely shifting said tools into cutting engagement with said work piece, means for relatively slowly turning said work piece; longitudinally progressing feed means carried by said bed, and means for effecting driving connection between said work holding means and said feed means to move said work carriage and work piece along said bed away from one of said tool carriages and toward the other thereof concurrently with said work piece revolution.

BERT V. MILLER.

REFERENCES CITED

The following references are of record in the file of this patent:

UNITED STATES PATENTS

| Number | Name | Date |
|---|---|---|
| 535,245 | Hadley | Mar. 5, 1895 |
| 1,361,098 | Richards | Dec. 7, 1920 |
| 1,613,577 | Fletcher | Jan. 4, 1927 |
| 2,191,777 | Stone | Feb. 27, 1940 |
| 2,286,477 | Falls | June 16, 1942 |
| 2,477,900 | Ridge | Aug. 2, 1949 |

FOREIGN PATENTS

| Number | Country | Date |
|---|---|---|
| 131,944 | Great Britain | Sept. 11, 1919 |